(12) United States Patent
Bauer et al.

(10) Patent No.: US 10,457,180 B2
(45) Date of Patent: Oct. 29, 2019

(54) METHOD FOR MONITORING THE PRESSURE IN A DEVICE FOR PNEUMATICALLY ADJUSTING A SEAT IN A TRANSPORTATION MEANS

(71) Applicant: Conti Temic microelectronic GmbH, Nuremberg (DE)

(72) Inventors: Stefan Bauer, Engelbrechtsmuenster (DE); Michael Beuschel, Stammham (DE); Mehmet Cini, Kipfenberg (DE); Markus Ziegelmeier, Buxheim (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 4 days.

(21) Appl. No.: 15/745,386

(22) PCT Filed: Jul. 5, 2016

(86) PCT No.: PCT/EP2016/065881
§ 371 (c)(1),
(2) Date: Jan. 16, 2018

(87) PCT Pub. No.: WO2017/012863
PCT Pub. Date: Jan. 26, 2017

(65) Prior Publication Data
US 2019/0092203 A1    Mar. 28, 2019

(30) Foreign Application Priority Data
Jul. 17, 2015  (DE) .................. 10 2015 213 442

(51) Int. Cl.
*B60R 21/0136* (2006.01)
*B60N 2/90* (2018.01)
(Continued)

(52) U.S. Cl.
CPC .......... *B60N 2/914* (2018.02); *B60N 2/0248* (2013.01); *B60N 2/665* (2015.04); *G01L 1/02* (2013.01); *G01L 7/022* (2013.01)

(58) Field of Classification Search
USPC ............................................ 280/735; 73/731
See application file for complete search history.

(56) References Cited

U.S. PATENT DOCUMENTS 6,422,087 B1   7/2002  Potter
7,770,920 B2*  8/2010  Breed et al.
(Continued)

FOREIGN PATENT DOCUMENTS

CN    101734180 A    6/2010
CN    101734182 A    6/2010
(Continued)

OTHER PUBLICATIONS

International Search Report and Written Opinion dated Oct. 26, 2016 from corresponding International Patent Application No. PCT/EP2016/065881.
(Continued)

*Primary Examiner* — Masud Ahmed

(57) ABSTRACT

The invention relates to a method for monitoring the pressure in a device for the pneumatic adjustment of a seat in a transportation means, in particular in a motor vehicle. The device comprises a plurality of cushions (101, 102, ..., 105) which are able to be filled with air and which are connected via respective valves (201, 202, ..., 205) to a common preliminary pressure volume (3), wherein a pressure sensor (4) is provided for measuring the pressure (p) in the preliminary pressure volume (3) and the preliminary pressure volume (3) is coupled to a compressor (6) for supplying compressed air without a non-return valve being connected therebetween. For the purpose of monitoring the pressure in
(Continued)

Figure 1:
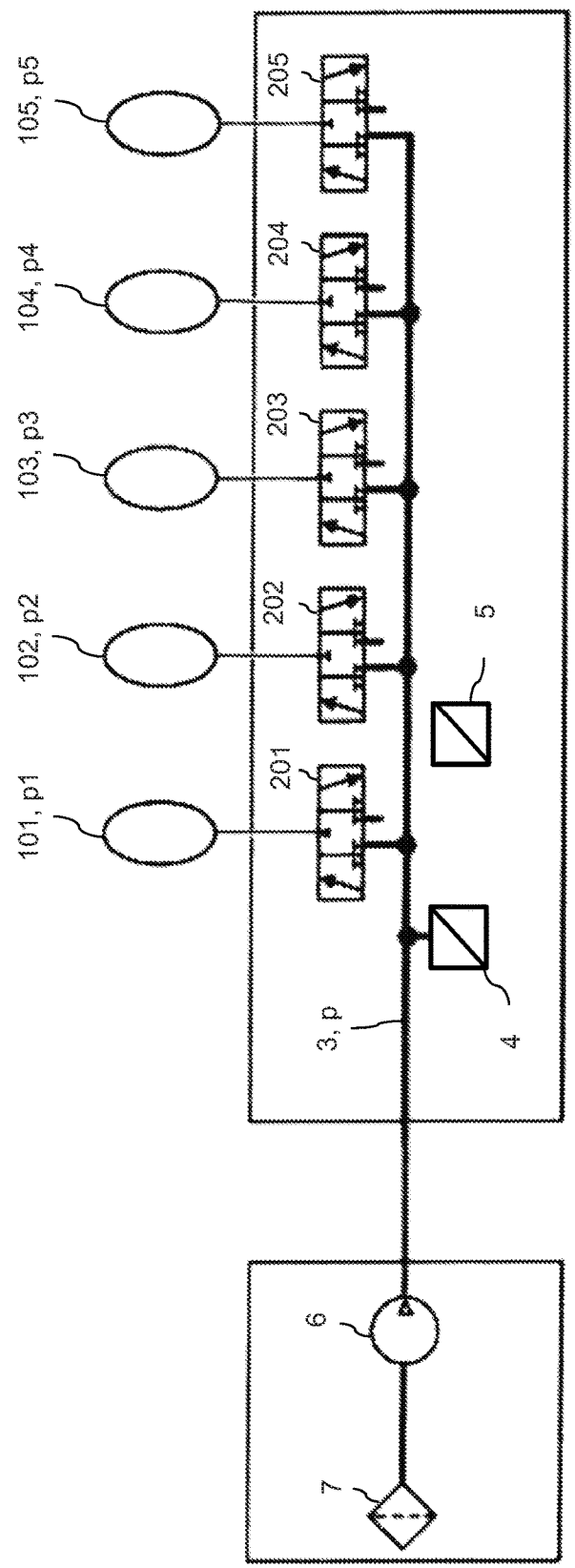

a respective cushion (101, 102, ..., 105), a predefined pressure is set in the preliminary pressure volume by way of operation of the compressor (6) and/or by way of air discharge from the preliminary pressure volume (3) via at least one leak, with the valve (201, 202, ..., 205) between the respective cushion (101, 102, ..., 105) and the preliminary pressure volume (3) closed, wherein the predefined pressure deviates from a target pressure (p1, p2, ..., p5) in the respective cushion (101, 102, ..., 105) by at most 10% of the target pressure and/or at most 50 hPa. After the setting of the predefined pressure, the valve (101, 102, ..., 105) between the respective cushion (101, 102, ..., 105) and the preliminary pressure volume (3) is opened and the pressure in the preliminary pressure volume (3) is measured via the pressure sensor (4). If the measured pressure (p) deviates from the target pressure (p1, p2, ..., p5), the measured pressure (p) is set to the target pressure (p1, p2, ..., p5) by way of operation of the compressor (6) and/or by way of air discharge from the preliminary pressure volume (3) via the at least one leak.

20 Claims, 5 Drawing Sheets

(51) Int. Cl.
*B60N 2/66* (2006.01)
*B60N 2/02* (2006.01)
*G01L 1/02* (2006.01)
*G01L 7/02* (2006.01)

(56) References Cited

U.S. PATENT DOCUMENTS

| | | | |
|---|---|---|---|
| 7,900,736 | B2 * | 3/2011 | Breed |
| 8,820,782 | B2 * | 9/2014 | Breed et al. |
| 9,120,410 | B2 * | 9/2015 | Bauman |
| 2006/0279125 | A1 * | 12/2006 | Leutert |
| 2007/0228703 | A1 * | 10/2007 | Breed |
| 2010/0117414 | A1 | 5/2010 | Hwang et al. |
| 2015/0033522 | A1 | 2/2015 | Beuschel et al. |

FOREIGN PATENT DOCUMENTS

| | | |
|---|---|---|
| CN | 102125361 A | 7/2011 |
| CN | 104394737 A | 3/2015 |
| DE | 3541537 A1 | 6/1986 |
| DE | 3804959 A1 | 8/1989 |
| DE | 19851456 A1 | 5/2000 |
| DE | 10202579 C1 | 5/2003 |
| WO | 00/03623 A2 | 1/2000 |

OTHER PUBLICATIONS

Office Action dated Apr. 13, 2016 for corresponding German Patent Application No. 10 2015 213 442.3.

* cited by examiner

METHOD FOR MONITORING THE PRESSURE IN A DEVICE FOR PNEUMATICALLY ADJUSTING A SEAT IN A TRANSPORTATION MEANS

The invention relates to a method for monitoring the pressure in a device for the pneumatic adjustment of a seat in a transportation means.

In transportation means, such as for example motor vehicles or also rail vehicles or aircraft, use is increasingly made of devices for pneumatic seat adjustment. In such devices, elastic cushions which are able to be filled are used for shaping seat contours or for massaging purposes. These permit an individual adaptation of the seats to the occupant.

Devices for pneumatic seat adjustment are often equipped with a pressure measuring device in order, in each cushion, to measure, to store and, if required, to re-establish the prevailing air pressure. Measurement and corresponding readjustment of the pressure allows pressure changes as a result of fluctuations in the ambient pressure or in the ambient temperature, and also due to leaks, to be compensated.

Conventionally, in a device for pneumatic seat adjustment, the pressure of a respective cushion is measured in a preliminary pressure volume via a central pressure sensor, which volume is connected to the corresponding cushion via a valve. In this case, a non-return valve is furthermore provided between the preliminary pressure volume and a compressor which supplies compressed air to the preliminary pressure volume and the individual cushions. During the pressure measurement, the non-return valve prevents an excessive pressure drop.

The use of a non-return valve between the compressor and the preliminary pressure chamber has disadvantages, however. In particular, the non-return valve brings about a not inconsiderable pressure loss during the filling of the cushions and thus a lengthening of the filling times of the cushions. Also, the use of the non-return valve gives rise to additional costs.

It is an object of the invention to provide a method for monitoring the pressure in a device for the pneumatic adjustment of a seat in a transportation means, in which method the pressure monitoring is made possible in a simple and efficient manner even without the use of a non-return valve between the compressor and the preliminary pressure volume.

The method according to the invention serves for the monitoring of the pressure (that is to say the air pressure) in a device for pneumatic seat adjustment, wherein the seat to be adjusted is provided in a transportation means, this preferably being a motor vehicle but possibly also being another transportation means. Here, and in the following text, "pressure" or "measured pressure" is always to be understood as meaning the relative pressure in relation to the ambient pressure. The device for pneumatic seat adjustment comprises a plurality of cushions which are able to be filled with air and which are connected via respective valves to a common preliminary pressure volume, wherein a pressure sensor is provided for measuring the pressure in the preliminary pressure volume and the preliminary pressure volume is coupled to a compressor for supplying compressed air without a non-return valve being connected therebetween.

Within the context of the method according to the invention, for the purpose of monitoring the pressure in a respective cushion, the steps a) to c) described below are carried out. In a step a), a predefined pressure is set in the preliminary pressure volume by way of operation of the compressor and/or by way of air discharge from the preliminary pressure volume via at least one leak, with the valve between the respective cushion and the preliminary pressure volume closed. Here, the predefined pressure deviates from a target pressure in the respective cushion by at most 10% of the target pressure and/or at most 50 hPa. In a preferred variant, the predefined pressure deviates from a target pressure in the respective cushion by at most 7%, preferably by at most 5%, of the target pressure and/or by at most 30 hPa, preferably by at most 20 hPa. In a preferred variant, the predefined pressure corresponds to the target pressure. In order to establish when the predefined pressure is reached, a pressure measurement is preferably carried out by way of the pressure sensor.

In a step b), after setting of the predefined pressure, the valve between the respective cushion and the preliminary pressure volume is opened and the pressure in the preliminary pressure volume is measured via the pressure sensor. If the measured pressure deviates from the target pressure, in a step c), the measured pressure is set or adjusted to the target pressure by way of operation of the compressor and/or by way of air discharge from the preliminary pressure volume via the at least one leak.

The method according to the invention has the advantage that, by setting a preliminary pressure (that is to say the predefined pressure) in the region of the target pressure of the corresponding cushion, quick and precise pressure measurement with little need for readjustment is ensured without a non-return valve having to be provided between the compressor and the preliminary pressure volume. Here, the build-up of the predefined pressure in step a) is preferably realized both by way of operation of the compressor and by way of air discharge from the preliminary pressure volume.

In a particularly preferred variant, in step a), firstly the compressor is operated in order to set a pressure in the preliminary pressure volume above the predefined pressure. Subsequently, with the compressor switched off, the predefined pressure is set by way of air discharge via the at least one leak. This allows the predefined pressure to be set very precisely. Preferably, the predefined pressure is in this case higher than or of exactly the same magnitude as the corresponding target pressure. Preferably, in this variant, at least the steps a) and b), and if appropriate also the step c), are carried out for the respective cushions in the order of decreasing target pressures of the cushions. For cushions having the same target pressure, said steps may in this case be carried out both one immediately after the other and at the same time. This allows the setting of the predefined pressures or the target pressures to be achieved with the fewest possible compressor starts.

In a further variant, in step a), the compressor is operated continuously for setting the pressure in the preliminary pressure volume to the predefined pressure, wherein the predefined pressure is preferably lower than or of exactly the same magnitude as the target pressure. This variant is used in particular in the case of large leaks in the preliminary pressure volume. Preferably, in this embodiment, at least the steps a) and b), and if appropriate also the step c), are carried out for the respective cushions in the order of increasing target pressures of the cushions. By this means, continuous operation of the compressor can be achieved in one cycle of the monitoring of all cushions of the plurality of cushions.

In a further variant of the method according to the invention, the setting of the measured pressure to the target pressure in step c) takes place at the same time during the measurement in step b). If appropriate, the setting of the measured pressure to the target pressure in step c) can also take place only after the completion of step b).

Depending on the configuration of the method according to the invention, the steps a) to c) can be carried out in a continuous manner for each cushion. Equally, it is possible that firstly the steps a) and b) are carried out for each cushion, and subsequently, after these steps have been carried out, the method step c) is carried out for each cushion.

In a variant of the method according to the invention, the at least one leak comprises a first leak in the preliminary pressure volume, the size of which first leak is not able to be controlled, that is to say a leak which is present in the device and which is not able to be influenced is involved. Such a leak can be brought about for example by the compressor. Alternatively or additionally, the at least one leak can comprise a second leak which is produced by opening at least one valve between at least one cushion other than the respective, monitored cushion and the preliminary pressure volume. The size of the second leak can preferably also be varied via the corresponding valve. For example, in the event of a small first leak or no first leak at all, it is possible to use the second leak for setting the predefined pressure or the target pressure.

In a particularly preferred embodiment of the method according to the invention, the size of the first leak is measured prior to step a) being carried out, and, in dependence on the size of this first leak, which may possibly also be zero (that is to say no first leak is present), one or more parameters of the step a) and/or of the step b) and/or of the step c) are set differently.

In one configuration of the above variant, the duration of the measurement in step b) decreases monotonically with increasing size of the first leak, with the result that the pressure drop in the corresponding cushion remains small during the measurement and consequently an accurate measurement is ensured. The term "monotonic decrease" means a dependency according to which, with increasing size of the first leak, the duration of the measurement decreases at least once or, if appropriate, also multiple times or continuously, and under no circumstances increases. A monotonic decrease can be defined for example by a threshold value, wherein, in the event of the first leak being larger than the threshold value, the duration of the measurement decreases by a predefined value. A relatively long measurement time allows better averaging of the pressure value and thus the suppression of external disruptive influences (for example due to road, driving dynamics or movement of the occupant).

In a further configuration, a distinction is made between a first case and a second case. In the first case, in which the size of the first leak is below a first threshold value, in step a), firstly the compressor is operated in order to set a pressure in the preliminary pressure volume above the predefined pressure, and subsequently, with the compressor switched off, the predefined pressure is set by way of air discharge via the second leak. In the second case, in which the size of the first leak lies within a predefined interval of values which begins with the first threshold value and in which the leaks are greater than or equal to the first threshold value, in step a), firstly the compressor is operated in order to set a pressure in the preliminary pressure volume above the predefined pressure, and subsequently, with the compressor switched off, the predefined pressure is set by way of air discharge only via the first leak. With this variant, the duration of the method in the case of small first leaks is suitably shortened by activating a second leak.

In a further configuration of the method according to the invention, a third case, in which the size of the first leak exceeds a second threshold value, is considered. In this case, in step a), the compressor is operated continuously, wherein the compressor continues to be in operation at the beginning of the measurement in step b). Preferably, said second threshold value is an upper limit of the above-described predefined interval of values. This ensures the method is able to be carried out even in the case of very large first leaks.

In a further preferred embodiment of the invention, in the event of an increase in the ambient pressure being established while the transportation means is in motion, the respective cushions are monitored in the order of increasing target pressures, and, for each cushion, the setting of the measured pressure to the target pressure in step c) takes place during the measurement in step b). By this means, efficient measurement with little need for readjustment is achieved.

In a further variant, in the event of an decrease in the ambient pressure being established while the transportation means is in motion, the respective cushions are monitored in the order of decreasing target pressures, and, for each cushion, the setting of the measured pressure to the target pressure in step c) takes place during the measurement in step b). With this variant too, efficient measurement with little need for readjustment is achieved.

In all the above-described variants of the invention, for cushions having the same target pressure, it is possible for the respective monitoring processes for these cushions according to the steps a) to c) to be carried out both one immediately after the other and at the same time.

In addition to the above-described method, the invention relates to a device for the pneumatic adjustment of a seat in a transportation means, in particular in a motor vehicle, wherein the device comprises a plurality of cushions which are able to be filled with air and which are connected via respective valves to a common preliminary pressure volume, wherein a pressure sensor is provided for measuring the pressure in the preliminary pressure volume and the preliminary pressure volume is coupled to a compressor for supplying compressed air without a non-return valve being connected therebetween. Said device comprises a means which serves for monitoring pressure and which is configured such that, for the purpose of monitoring the pressure in a respective cushion, the means carries out the steps a) to c) of the method according to the invention. Preferably, the device for pneumatic seat adjustment or the means for monitoring pressure is configured for carrying out one or more preferred variants of the method according to the invention.

Exemplary embodiments of the invention will be described in detail below on the basis of the appended figures.

In the figures:

FIG. 1 shows a schematic illustration of a device for pneumatic seat adjustment in which an embodiment of the method according to the invention is implemented;

FIG. 2 to FIG. 5 each show diagrams which illustrate different operating modes of the method according to the invention for monitoring the pressure in a device for pneumatic seat adjustment.

Below, an embodiment of the method according to the invention will be described on the basis of a device for pneumatic seat adjustment, which is shown in FIG. 1. Said seat adjustment means is integrated in the seat of a motor vehicle and serves for example as a lumbar support. The seat adjustment means comprises five air cushions 101, 102, 103, 104 and 105 which, depending on the setting of the seat, are filled with air differently and thus have different volumes and pressures. For a currently selected seat setting, corresponding target pressures for the individual cushions are stored, specifically a target pressure p1 for the cushion 101, a target pressure p2 for the cushion 102, a target pressure p3 for the cushion 103, a target pressure p4 for the cushion 104 and a target pressure p5 for the cushion 105. The pressures in the individual cushions should correspond to these target pressures in order hereby to ensure the selected seat setting.

Each individual cushion is assigned a 3/3-way valve via which the corresponding cushion is connected to a preliminary pressure hose 3 which is fed via a compressor 6 and which represents the preliminary pressure volume within the context of the patent claims. Also, an intake filter 7 is provided at the compressor 6 in order to prevent the ingress of dirt particles during operation of the compressor. As can be seen from FIG. 1, the cushion 101 is connected via the valve 201, the cushion 102 is connected via the valve 202, the cushion 103 is connected via the valve 203, the cushion 104 is connected via the valve 204 and the cushion 105 is connected via the valve 205 to the common preliminary pressure volume 3. In the left-hand switching position of the respective 3/3-way valves, the supply of compressed air from the preliminary pressure volume to the corresponding cushion, or also in the opposite flow direction, is realized. In the middle switching position of the respective valves, the preliminary pressure volume is disconnected from the individual cushions. Via the right-hand switching position of the respective valves, the deaeration of the corresponding cushions is realized.

At the preliminary pressure hose 3 there is also provided a central pressure sensor 4 via which the pressure in the preliminary pressure volume is detected. Here, and in the following text, said "pressure" is to be understood as meaning the relative pressure in relation to the ambient pressure. The pressure measured via the central pressure sensor 4 is denoted by p in FIG. 1. Furthermore, a further sensor 5 for measuring the (absolute) ambient pressure is installed in the device. In this case, the relative pressure can also be determined as the difference between a pressure, measured in absolute terms, of the pressure sensor 4 and the ambient pressure (pressure sensor 5).

As can be seen from FIG. 1, the preliminary pressure hose 3 is connected directly to the compressor 6 without a non-return valve being connected therebetween. Here, the device for seat adjustment differs from conventional seat adjustment means in which a non-return valve is installed between the preliminary pressure hose and the compressor. Although, during the monitoring of the pressure in the individual cushions by means of the pressure sensor 4, said non-return valve prevents an excessive pressure drop, the valve has other disadvantages. In particular, it leads to a not inconsiderable pressure loss during the filling of the respective cushions and thus lengthens the filling times for the cushions. Also, the use of the non-return valve entails additional costs for material and assembly, and for effort involved in testing.

Said disadvantages are avoided in the device in FIG. 1, wherein suitable monitoring of the individual pressures in the cushions is nevertheless achieved by means of the variants of the method according to the invention which are described below.

In order to ensure that the individual cushions 101 to 105 maintain the desired target pressure, the pressure of the individual cushions is measured by way of the method according to the invention and, if appropriate, readjusted. Here, a common characteristic of all variants described below is that, prior to each measurement of the pressure of a respective cushion, firstly a predefined pressure is run up to in the preliminary pressure volume, which pressure deviates from the target pressure in the respective cushion by at most 10% of the target pressure and/or at most 50 hPa, in the closed position of the valve assigned to the respective cushion. Consequently, when subsequently opening the valve, assigned to the respective cushion, during the pressure measurement, both the pressure surge and the air loss is minimized. A certain pressure surge arises only in the case of a cushion pressure deviating significantly from the target pressure, which surge, however, at the same time acts in a readjusting manner, that is to say the cushion pressure is altered in a manner toward the target pressure.

The run-up to the predefined pressure, which lies in the region of the target pressure of the respective cushion, is an essential feature of the invention since only by this means is efficient and accurate measurement of the corresponding pressure in the cushion made possible. Said measurement is initiated after the run-up to the target pressure by opening the valve between the monitored cushion and the preliminary pressure hose. The pressure measurement is carried out by the central pressure sensor 4 already described, which is connected to the preliminary pressure hose 3.

In a preferred variant, the target pressure of the monitor cushion is run up to as accurately as possible in the preliminary pressure volume. Depending on configuration, the run-up of the pressure in the preliminary pressure volume to the target pressure can occur in a different way. In particular, the pressure can be set by way of slow running of the compressor (for example lowest, safely starting partial load, possibly with start-up detection or slowly increasing voltage ramp), wherein, if appropriate, at the same time a leak which is present in the preliminary pressure volume can be used. A "leak which is present" is in this case a leak which is not able to be controlled within the context of the method and which forms for example at the compressor during its operation. If appropriate, in order to run up the pressure, the use of an additional, controllable leak which is produced by way of a valve, activated to a small extent, between a pressureless cushion, which is not the cushion currently being checked, and the preliminary pressure volume is also possible. Due to said switching valve being activated to a small extent, the valve opens only minimally. The activation to a small extent can be realized for example by way of a slowly increasing voltage/current ramp up to a fixed, maximum (negative) pressure gradient.

In a preferred variant, a combination of compressor running and leakage is used for the run-up of the pressure to the target pressure. In this case, firstly a pressure above the target pressure is built up in the preliminary pressure volume by means of the compressor, and subsequently, and if appropriate also at the same time as the pressure build-up, a pressure drop is brought about via the corresponding leak.

In order to minimize the loss of air during the measurement process, in a further preferred variant, the measurement sequence is fixed in dependence on the sizes of the individual target pressures in the air cushions. In particular, the pressures of the cushions are measured in decreasing order of their target pressures. In this case, the preliminary pressure volume is filled only once by means of the compressor, and subsequently, the individual target pressures are set by way of air discharge via a corresponding leak. This allows the number of the starting operations of the compressor to be minimized. The measurement duration for determining the pressure in the preliminary pressure volume is preferably adapted to the pressure loss. In particular in the case of a considerable pressure drop (that is to say in the case of increased leakage in the preliminary pressure volume), the measurement duration is shortened such that the pressure drop in the cushion during the measurement remains imperceptible.

Depending on the configuration of the method, the corresponding pressure corrections of the cushions for setting the target pressure can take place, by way of filling or deaeration, either immediately after the pressure measurement of each individual cushion or, if appropriate, also at a later point in time only after the measurement of all the air cushions.

In a further preferred embodiment of the method according to the invention, a pressure which deviates from the target pressure of the cushion currently being checked is run up to in the preliminary pressure volume prior to the measurement. As already mentioned, said deviation is at most 10% or 50 hPa. The deviation can possibly also be limited to merely 5% of the target pressure or 20 hPa. In other words, as a consequence, already just prior to the expected target pressure being reached, the measurement of the pressure of the corresponding cushion is started by opening the valve at this cushion. Depending on the direction from which the pressure in the preliminary pressure volume is run up (that is to say from below by way of the running of the compressor or from above via leakage), the predefined pressure, at which the measurement is started, is below the target pressure or above the target pressure.

According to this variant of the invention, in the case of a small deviation of the actual pressure of the cushion currently being checked from the target pressure, only a very slight and imperceptible pressure surge as a result of the pressure equalization between the cushion and the preliminary pressure volume arises. Here, the cushion pressure is firstly changed slightly and in an opposite manner to the pressure profile of the preliminary pressure volume. The measure for the run-up of the pressure (that is to say the running of the compressor and/or leakage) continues to remain active in this case. As soon as the desired target pressure of the cushion is reached, the pressure run-up measure is deactivated or the corresponding valve between the cushion and the preliminary pressure hose is closed.

In a specific realization of the variant described immediately above, by running up the pressure from below by way of slow running of the compressor, the corresponding valve at the cushion to be checked is opened already at a pressure of approximately 50 hPa below the target pressure. Consequently, the cushion pressure drops, for example by 5 hPa. The pressure then rises to the target pressure by way of the still-running compressor, whereupon the compressor is switched off or the valve is closed.

In a further realization, during the run-up of the pressure from above by way of a leak, the corresponding valve at the cushion is opened already at a pressure in the preliminary pressure volume of, for example, 50 hPa above the target pressure. Consequently, the cushion pressure rises, for example by 5 hPa. After a short time, the pressure in the cushion and in the preliminary pressure volume has then dropped to the target pressure by way of the leak which continues to be present. The valve at the air cushion is then closed. If the leak was produced artificially by way of activation of a further valve, said further valve is also deactivated or closed at this point in time.

Below, a further embodiment of the method according to the invention is described in which corresponding parameters of the individual method steps are fixed in dependence on the size of a leak which is present in the preliminary pressure volume. Here, an air cushion whose currently stored target pressure is 200 hPa is considered. Typical volumes of cushions in seat adjustment means of motor vehicles are between 200 ml and 1000 ml in the case of a maximum fill level. For a lumbar support, a typical cushion volume is 600 ml in the case of a maximum fill level. As a rule, the maximum cushion volume is in this case 10 to 30 times larger than the preliminary pressure volume.

In order to establish the size of the leak, the preliminary pressure volume is firstly filled by way of operation of the compressor. Here, the compressor is run at low rotational speed until a desired pressure in the preliminary pressure volume has been established. Said pressure can be either a fixed pressure above the maximum settable cushion pressure (for example 550 hPa) or a pressure above the expected target pressure (for example 250 hPa). Subsequently, the size of the leak is measured via the pressure drop in the preliminary pressure volume, which pressure drop is detected by way of the pressure sensor 4. In dependence on the size of the leak, a case distinction is made in accordance with the cases (a) to (d) discussed below, wherein case (a) corresponds to a small leak, case (b) corresponds to a medium-sized leak, case (c) corresponds to a large leak, and case (d) corresponds to an extremely large leak. The individual cases can be classified for example based on the following threshold values:

Case (a): small leak ≤1 ml/min (pressure drop ≤1 hPa/s)
Case (b): medium-sized leak ≤10 ml/min (pressure drop ≤10 hPa/s)
Case (c): large leak ≤100 ml/min (pressure drop ≤100 hPa/s)
Case (d): extreme leak >100 ml/min (pressure drop >100 hPa/s)

Figure 2:
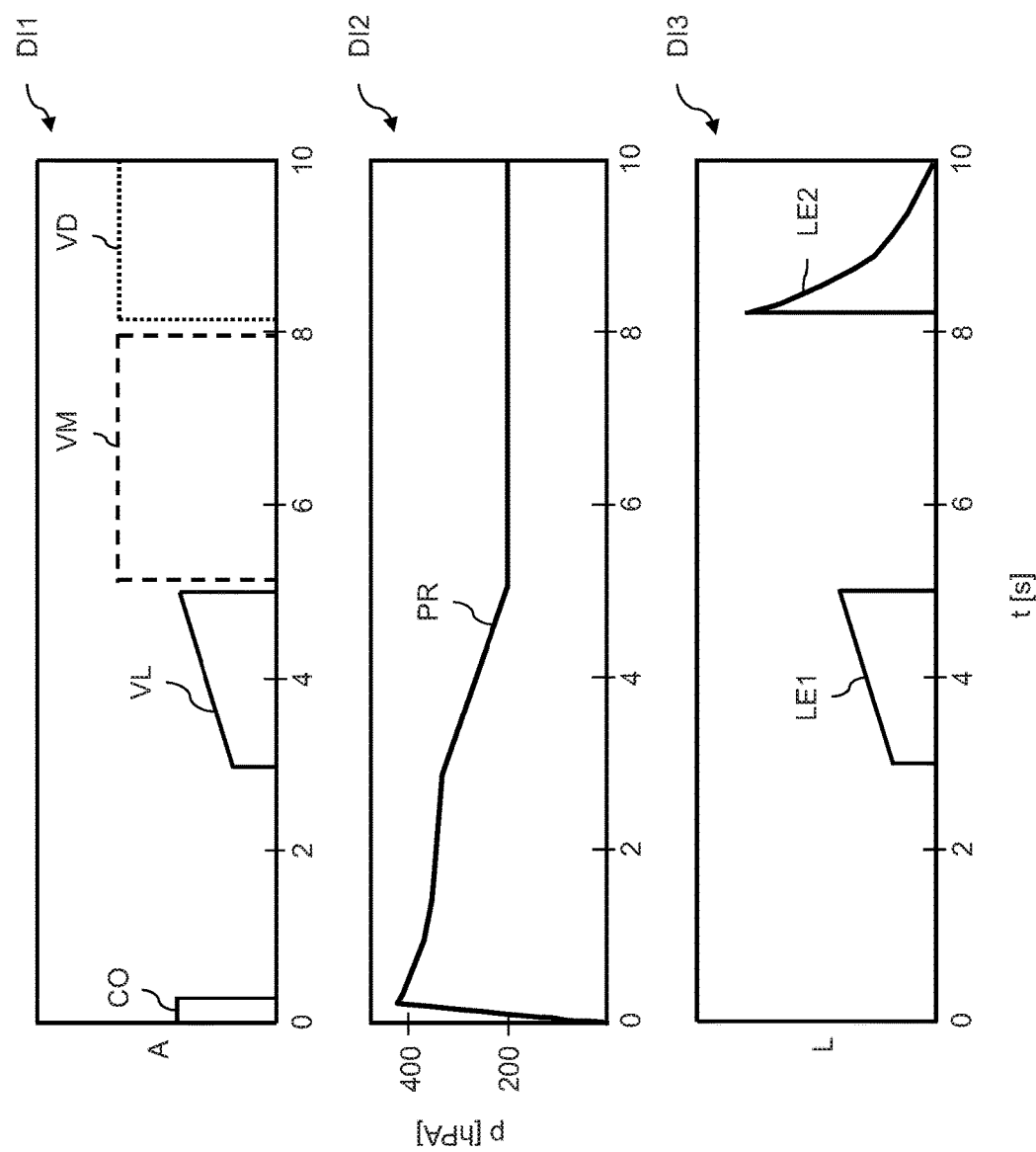

If a small leak according to case (a) is present, the run-up of the pressure and the subsequent measurement occurs according to the illustration in FIG. 2. This figure comprises the three diagrams DI1, DI2 and DI3. In all diagrams, the abscissa t refers to the time in seconds. The ordinate A of diagram DI1 shows, dimensionlessly, the electrical activation, and thus the actuation, of the compressor or corresponding valves. The ordinate of diagram DI2 shows the pressure in the preliminary pressure volume in hectopascals. The ordinate of diagram DI3 shows, dimensionlessly, the size L of corresponding leaks. The definitions of the ordinate and abscissa in the individual diagrams DI1 to DI3 analogously also apply to FIG. 3 to FIG. 5.

In case (a), firstly the compressor is operated for a short time period, as can be seen by the line CO of diagram DI1. The pressure of the preliminary pressure volume according to the line PR of diagram DI2 then rises to more than 400 hPa, and firstly drops gently to approximately 450 hPa due to thermal equalization effects. Subsequently, the measurement of the leak takes place. As can be seen, the leak is small since the pressure in the preliminary pressure volume decreases only slowly. After the measurement of the leak, it is thus established that case (a) is present.

Due to the small leak which is present, in this case, a further leak is produced by opening a valve for an empty cushion. The activation or actuation of said further valve is indicated in diagram DI1 by the line VL. In this case, the result is the leak illustrated in diagram DI3 by way of the line LE1. As soon as the desired target pressure in the preliminary pressure volume is reached, the leak valve is closed. Afterwards, the measurement of the pressure in the cushion to be checked is brought about by opening the valve assigned to the cushion. This is indicated in diagram DI1 in FIG. 2 by the line VM. In the scenario illustrated in FIG. 2, the measured pressure according to the line PR corresponds in this case already to the desired target pressure, and so no further setting of the pressure is required.

After completion of the measurement, it is finally necessary to deaerate, by way of corresponding activation of the assigned valve, the cushion used for producing the further leak, wherein the activation of said valve is indicated by the line VD in diagram DI1. The leak which results in this way is illustrated by the line LE2 in diagram DI3 in FIG. 2.

As already mentioned, for producing the additional leak, use is made of a valve with a connected empty cushion. In the case of a three-bladder lordosis, one cushion is normally not full here and can then be used for producing the leak.

Figure 3:
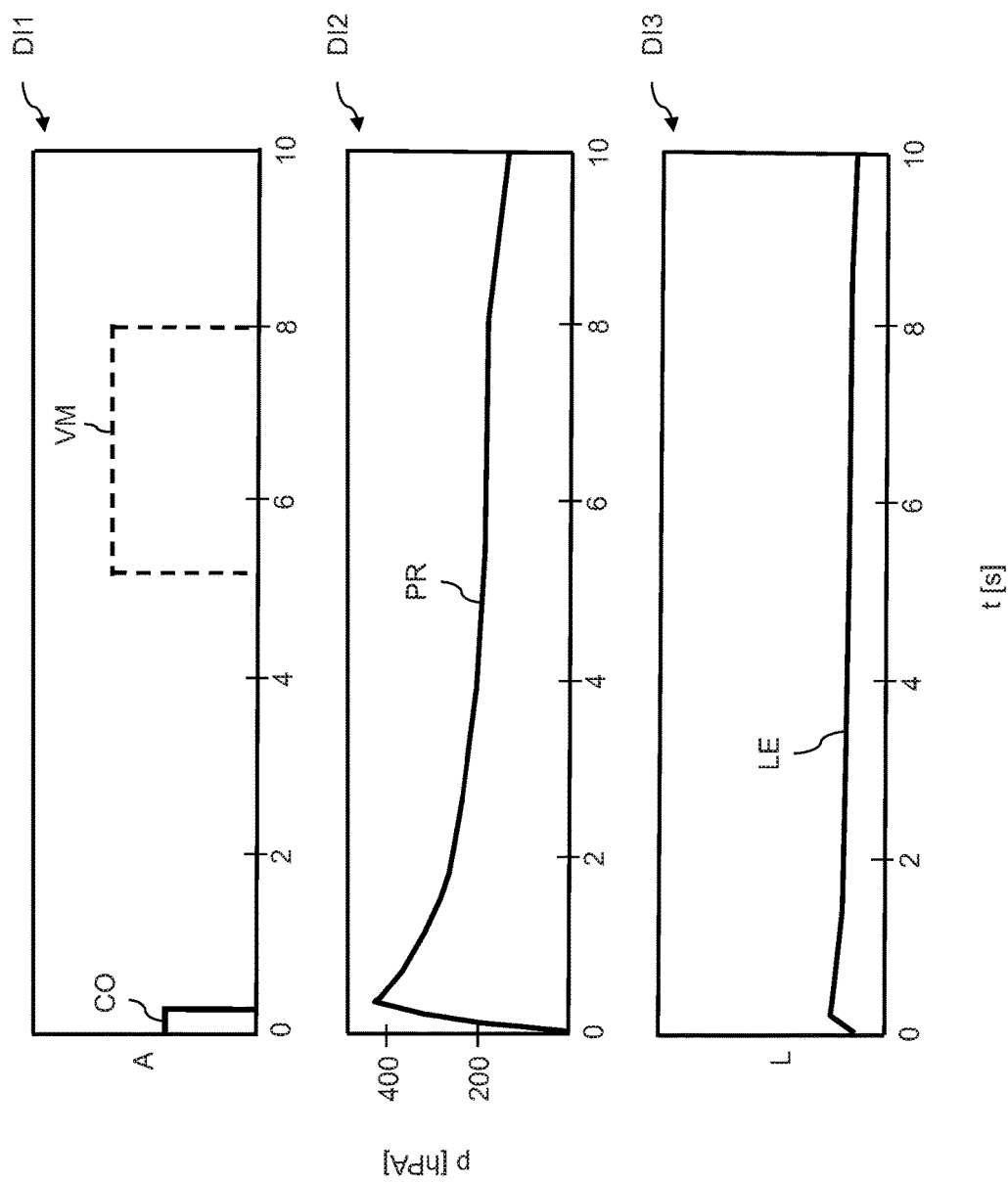

FIG. 3, discussed below, illustrates case (b) of the above case distinction. In this case, a medium-sized leak is present, with the result that the pressure in the preliminary pressure volume drops more rapidly, this being illustrated in diagram DI2 in FIG. 3 (line PR). FIG. 3 again indicates firstly filling of the preliminary pressure volume by means of the compressor according to the line CO to a value above 400 hPa, wherein subsequently, the leak is measured and a pressure drop which is more rapid than that in FIG. 2 results in this case. In other words, the leak which is present LE according to diagram DI3 in FIG. 3 is larger than the leak for case (a) above, which, without additional leakage, is close to 0 and, accordingly, not able to be seen from diagram DI3 in FIG. 2.

Due to the larger leak in case (b), it is now not necessary to produce an additional leak by way of activation of a valve for an empty cushion. Thus, in case (b), purely based on the leak which is present, the reaching of the desired target pressure as in case (a) is awaited. Subsequently, according to the line VM in diagram DI1 in FIG. 3, the measurement of the pressure of the corresponding cushion is started by opening the assigned valve. In the scenario in FIG. 3 too, the measured pressure corresponds in this case to the expected target pressure, and so no readjustment of the pressure is necessary. In modifications of the above variants (a) and (b), it is also possible for a pressure which is slightly higher than the target pressure (for example cushion pressure+20 hPa for case (a), or cushion pressure+50 hPa for case (b)) to be set at the beginning of the measurement. In this way, losses during the measurement duration are compensated.

Case (c) above for a large leak differs from the control according to FIG. 3 only in that the measurement duration is shortened in comparison with case (b), with the result that the pressure drop in the cushion during the measurement remains as small as possible.

Case (d) above can arise under unfavorable conditions, for example if, at very cold temperatures, the compressor has a large leak due to material stiffness. A measurement as in cases (a) to (c) is not expedient in this case. Thus, a readjustment of the pressure for the purpose of setting the target pressure is always carried out directly. For this purpose, the compressor is firstly started at low rotational speed. As soon as the preliminary pressure volume has reached the expected target pressure (possibly with negative allowance, for example cushion pressure−50 hPa), the associated valve is opened and the pressure is further measured. The compressor is switched off as soon as the desired target pressure is reached or slightly exceeded.

If the cushion pressure is slightly above the target pressure, the cushion still has to be deaerated. This preferably occurs by way of the large leak, which is already present, of the compressor. In this case, with the compressor switched off, the corresponding valve for the cushion remains open until the cushion pressure has dropped to the desired target value. Normally, the pressure rise or pressure drop by way of the described measures lies within an imperceptible regulation tolerance of approximately 10 to 50 hPa.

Figure 4:
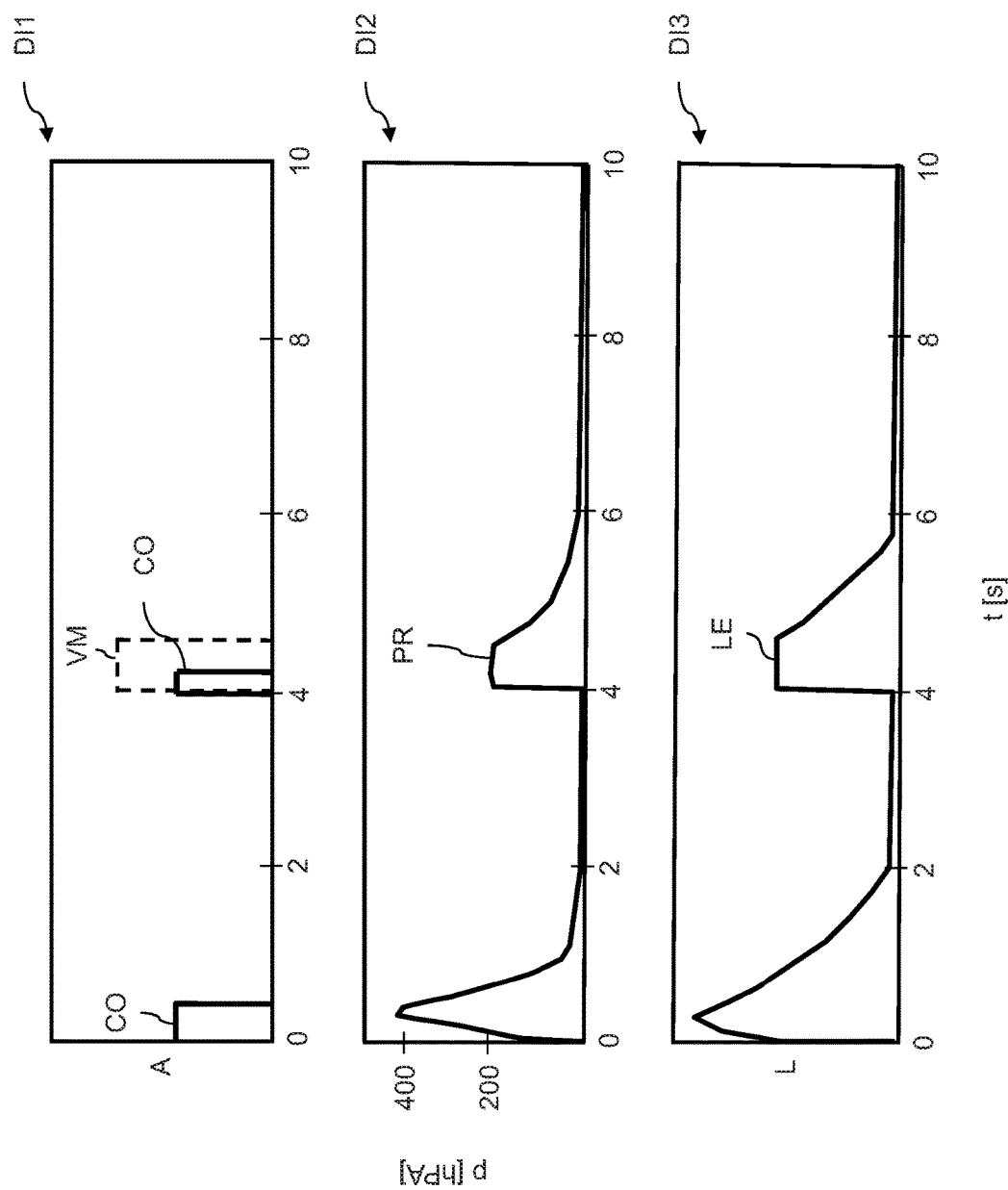
Figure 5:
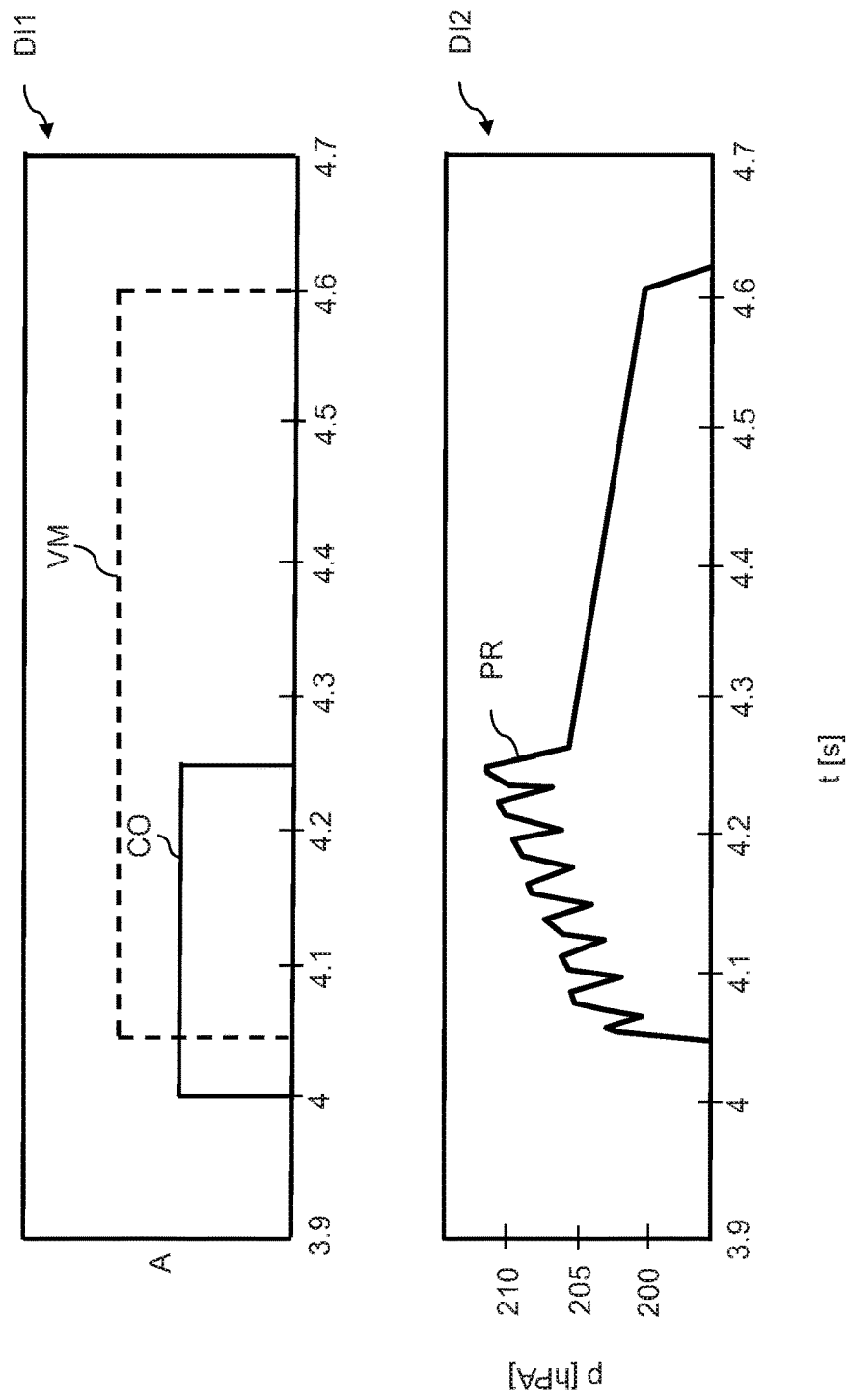

FIG. 4 and FIG. 5 again illustrate the pressure measurement and pressure regulation according to case (d) above. The temporal development of the pressure is again indicated by the line PR in diagram DI2 in FIG. 4 and FIG. 5. According to diagram DI1 in FIG. 4, a pressure in the preliminary pressure volume of more than 400 hPa is firstly generated by way of operation of the compressor according to the line CO, and subsequently the pressure drop, which in case (d) is very large, is measured. Finally, the compressor is switched on again at 4 s (further line CO). If the target pressure is then reached, the valve for the cushion to be checked opens. At the same time, the measurement of the pressure in the preliminary pressure volume is started. This is illustrated again in the corresponding detailed view from FIG. 5 for a section of the time axis t. As can be seen, the compressor according to the line CO is firstly switched on prior to the pressure measurement according to the line VM and remains switched on over a certain time period after the start of the pressure measurement. From diagram DI2 in FIG. 5, the pulsating pressure increase caused by the piston movement of the compressor can also be seen at the same time. After the compressor is switched off, the corresponding valve for the air cushion remains open until, due to the leak which is present, the pressure has dropped to the desired target pressure.

In a further preferred embodiment, it is also possible for the measurement and the regulation of the pressure to be linked to the situation where a drop or a rise in the ambient pressure is established. A drop in the ambient pressure results for example in the case of an ascent of the corresponding motor vehicle, and a rise in the case of a descent. In the case of an increasing ambient pressure, which leads to a dropping cushion pressure, in a preferred embodiment, all cushions are measured, and readjusted, in the order of increasing target pressures one after the other without the pressure in the preliminary pressure volume being relieved in the intervening period. Preferably here, the compressor can operate continuously without interruption if each cushion has to be refilled.

By contrast to a rising ambient pressure, in the case of a dropping ambient pressure being established, all cushions are measured, and readjusted, in the order of decreasing target pressures one after the other. In this case, the compressor firstly fills the preliminary pressure volume to the highest expected target pressure. Subsequently, the compressor is switched off, with the result that the pressure in the preliminary pressure volume gradually drops via the leak present or the possibly additional leak, while the cushions are connected, and readjusted by way of deaeration, one after the other. Preferably, the leak valve remains continuously activated in this case, if appropriate with the dropping pressure being compensated, so that the pressure gradient remains constant.

The above-described embodiments of the invention have numerous advantages. In particular, in a device for pneumatic seat adjustment, it is possible to dispense with a non-return valve between the preliminary pressure volume and the compressor, wherein at the same time, however, suitable monitoring of the pressure of the individual cushions via the method according to the invention is ensured. By omitting the non-return valve, the flow resistance during the filling of the device is reduced, and the filling time is thus shortened. Furthermore, costs are saved due to the omission of the non-return valve.

If appropriate, the pressure sensor used in the method according to the invention can also be used for multiple, connected pneumatic seat adjustment means, whereby costs in systems having multiple seat adjustment means are saved. Also, the central pressure sensor may, if appropriate, also additionally be used for continuous pressure measurement of connected massage control devices.

LIST OF REFERENCE SIGNS

101, 102, 103, 104, 105 Air cushions
201, 202, 203, 204, 205 Valves
3 Preliminary pressure chamber
4, 5 Pressure sensor
6 Compressor
7 Intake filter
DI1, DI2, DI3 Diagrams
A Activation
L Leak
t Time
CO, VM, VL, VD Lines in diagram DI1
PR Line in diagram DI2
LE, LE1, LE2 Lines in diagram DI3

The invention claimed is:

1. A method for monitoring the pressure in a device for the pneumatic adjustment of a seat in a transportation means, wherein the device comprises a plurality of cushions configured to be filled with air and coupled via respective valves to a common preliminary pressure volume, wherein a pressure sensor is provided for measuring the pressure in the preliminary pressure volume and the preliminary pressure volume is coupled to a compressor for supplying compressed air without a non-return valve being connected therebetween, the method comprising the following steps:
   a) setting a predefined pressure in the preliminary pressure volume using at least one of the operation of the compressor and air discharge from the preliminary pressure volume via at least one leak, with the valve closed between the respective cushion and the preliminary pressure volume, wherein first, the compressor is operated to set a pressure in the preliminary pressure volume above the predefined pressure, and subsequently, with the compressor switched off, the predefined pressure is set by air discharge via the at least one leak and wherein size of the leak is not able to be controlled, wherein the predefined pressure deviates from a target pressure in the respective cushion by at most at least one of 10% of the target pressure and 50 hPa;
   b) after setting of the predefined pressure, opening the valve between the respective cushion and the preliminary pressure volume and measuring the pressure in the preliminary pressure volume via the pressure sensor;
   c) if the measured pressure deviates from the target pressure, setting the measured pressure to the target pressure by at least one of the operation of the compressor and air discharge from the preliminary pressure volume via the at least one leak.

2. The method as claimed in claim 1, wherein at least the steps a) and b) are carried out for the respective cushions), preferably in the order of decreasing target pressures of the cushions.

3. The method as claimed in claim 1, wherein, in step a), the compressor is operated continuously for setting the pressure in the preliminary pressure volume to the predefined pressure, and wherein at least the steps a) and b) are carried out for the respective cushions, preferably in the order of increasing target pressures of the cushions.

4. The method as claimed in claim 1, wherein at least one of the setting of the measured pressure to the target pressure in step c) takes place during the measurement in step b), and the setting of the measured pressure to the target pressure in step c) takes place after the completion of step b).

5. The method as claimed in claim 1, wherein at least one of the steps a) to c) are carried out in a continuous manner for each cushion, and in that firstly the steps a) and b) are carried out for each cushion, and subsequently the step c) is carried out for each cushion.

6. The method as claimed in claim 1, wherein the at least one leak comprises at least one of a first leak in the preliminary pressure volume, the size of the first leak is not being controllable, and a second leak produced by opening at least one valve between at least one cushion other than the respective cushion and the preliminary pressure volume.

7. The method as claimed in claim 6, wherein the size of the first leak is measured prior to step a, and, depending on the size of the first leak, one or more parameters of at least one of step a), step b) and step c) are set differently.

8. The method as claimed in claim 7, wherein the duration of the measurement in step b) decreases monotonically with increasing size of the first leak.

9. The method as claimed in claim 7, wherein
   when the size of the first leak is below a first threshold value, in step a), first, the compressor is operated to set a pressure in the preliminary pressure volume above the predefined pressure, and subsequently, with the compressor switched off, the predefined pressure is set by air discharge via the second leak;
   when the size of the first leak lies within a predefined interval of values which begins with the first threshold value and in which the leaks are greater than or equal to the first threshold value, in step a), first, the compressor is operated to set a pressure in the preliminary pressure volume above the predefined pressure, and subsequently, with the compressor switched off, the predefined pressure is set by air discharge only via the first leak.

10. The method as claimed in one of claim 7, wherein, when the size of the first leak exceeds a second threshold value, in step a), the compressor is operated continuously, wherein the compressor continues to operate at the beginning of the measurement in step b).

11. The method as claimed in claim 9, wherein the second threshold value is an upper limit of the predefined interval of values.

12. The method as claimed in claim 1, wherein, upon an increase in the ambient pressure being established while the transportation means is in motion, the respective cushions are monitored in the order of increasing target pressures, and, for each cushion, the setting of the measured pressure to the target pressure in step c) takes place during the measurement in step b).

13. The method as claimed in claim 1, wherein, upon a decrease in the ambient pressure being established while the transportation means is in motion, the respective cushions are monitored in the order of decreasing target pressures, and, for each cushion, the setting of the measured pressure to the target pressure in step c) takes place during the measurement in step b).

14. A device for the pneumatic adjustment of a seat in a transportation means, the device comprising:

a plurality of cushions configured to be filled with air and connected via respective valves to a common preliminary pressure volume, wherein a pressure sensor is provided for measuring the pressure in the preliminary pressure volume and the preliminary pressure volume is coupled to a compressor configured to supply compressed air without a non-return valve being connected therebetween, wherein the device further comprises a pressure monitoring system configured to carry out following method for monitoring the pressure in a respective cushion:

a) setting a predefined pressure in the preliminary pressure volume by at least on of operating the compressor and air discharge from the preliminary pressure volume via at least one leak, with the valve closed between the respective cushion and the preliminary pressure volume, wherein wherein first, the compressor is operated to set a pressure in the preliminary pressure volume above the predefined pressure, and subsequently, with the compressor switched off, the predefined pressure is set by air discharge via the at least one leak and wherein size of the leak is not able to be controlled, wherein the predefined pressure deviates from a target pressure in the respective cushion by at most at least one of 10% of the target pressure and 50 hPa;

b) after setting of the predefined pressure, opening the valve between the respective cushion and the preliminary pressure volume and measuring the pressure in the preliminary pressure volume via the pressure sensor;

c) if the measured pressure deviates from the target pressure, setting the measured pressure to the target pressure by at least one of operating the compressor and air discharge from the preliminary pressure volume via the at least one leak.

15. The device as claimed in claim 14, wherein at least the steps a) and b) are carried out for the respective cushions), preferably in the order of decreasing target pressures of the cushions.

16. The device as claimed in claim 14, wherein, in step a), the compressor is operated continuously for setting the pressure in the preliminary pressure volume to the predefined pressure, and wherein at least the steps a) and b) are carried out for the respective cushions, preferably in the order of increasing target pressures of the cushions.

17. The device as claimed in claim 14, wherein at least one of the setting of the measured pressure to the target pressure in step c) takes place during the measurement in step b), and the setting of the measured pressure to the target pressure in step c) takes place after the completion of step b).

18. The device as claimed in claim 14, wherein at least one of the steps a) to c) are carried out in a continuous manner for each cushion, and in that firstly the steps a) and b) are carried out for each cushion, and subsequently the step c) is carried out for each cushion.

19. The device as claimed in claim 14, wherein the at least one leak comprises at least one of a first leak in the preliminary pressure volume, the size of the first leak is not being controllable, and a second leak produced by opening at least one valve between at least one cushion other than the respective cushion and the preliminary pressure volume.

20. The method as claimed in claim 19, wherein the size of the first leak is measured prior to step a, and, depending on the size of the first leak, one or more parameters of at least one of step a), step b) and step c) are set differently.

* * * * *